US012583142B2

(12) United States Patent
Wattyn

(10) Patent No.: US 12,583,142 B2
(45) Date of Patent: Mar. 24, 2026

(54) PUNCHING STATION AND METHOD FOR A RELIEF PLATE PRECURSOR

(71) Applicant: XSYS Prepress N.V., Ypres (BE)

(72) Inventor: Bart Marc Luc Wattyn, Dentergem (BE)

(73) Assignee: XSYS PREPRESS N.V., Ypres (BE)

(*) Notice: Subject to any disclaimer, the term of this patent is extended or adjusted under 35 U.S.C. 154(b) by 726 days.

(21) Appl. No.: 17/765,409

(22) PCT Filed: Oct. 8, 2020

(86) PCT No.: PCT/EP2020/078203
§ 371 (c)(1),
(2) Date: Mar. 30, 2022

(87) PCT Pub. No.: WO2021/069540
PCT Pub. Date: Apr. 15, 2021

(65) Prior Publication Data

US 2022/0339812 A1 Oct. 27, 2022

(30) Foreign Application Priority Data

Oct. 10, 2019 (NL) ..................................... 2023988

(51) Int. Cl.
*B26D 5/32* (2006.01)
*B26D 5/34* (2006.01)
(Continued)

(52) U.S. Cl.
CPC ................. *B26D 5/32* (2013.01); *B26D 5/34* (2013.01); *B26F 1/0092* (2013.01); *B26F 1/24* (2013.01)

(58) Field of Classification Search
CPC . B26D 5/32; B26D 5/34; B26F 1/0092; B26F 1/24
See application file for complete search history.

(56) References Cited

U.S. PATENT DOCUMENTS 2,199,556 A * 5/1940 Carroll ..................... B41J 11/46 235/475
2,297,743 A * 10/1942 Carroll ................... G06K 1/121 400/570
(Continued)

FOREIGN PATENT DOCUMENTS

CN 101896347 A 11/2010
CN 104973443 A 10/2015
(Continued)

OTHER PUBLICATIONS

International Search Report and Written Opinion for PCT/EP2020/078203, mailed Nov. 1, 2020 (nine (9) pages).
(Continued)

*Primary Examiner* — Adam J Eiseman
*Assistant Examiner* — Fernando A Ayala
(74) *Attorney, Agent, or Firm* — KDW Firm PLLC

(57) ABSTRACT

A punching station for arranging one or more penetration elements in or through an edge portion of a relief plate precursor or for arranging one or more perforations in the edge portion. The punching station includes a punching means comprising one or more penetration elements or perforating elements, the punching means configured for arranging the one or more penetration elements or perforating elements through or in an edge portion of the relief plate precursor. An abutment means is aligned with the punching means and configured for forming an abutment for the edge of the relief plate precursor. A detection means is configured to detect at two or more locations along the abutment means whether the edge portion of the relief plate precursor is correctly positioned against the abutment means. A signalling means is configured to communicate a signal in function of the detection by the detection means.

20 Claims, 14 Drawing Sheets

(51) Int. Cl.
*B26F 1/00* (2006.01)
*B26F 1/24* (2006.01)

(56) References Cited

U.S. PATENT DOCUMENTS

| | | | | |
|---|---|---|---|---|
| 4,407,614 | A * | 10/1983 | Muhr | B21D 28/243 83/370 |
| 4,690,021 | A * | 9/1987 | Clark | B21D 28/12 271/223 |
| 5,023,631 | A | 6/1991 | Negishi | |
| 6,135,446 | A | 10/2000 | Thiemann | |
| 6,453,149 | B1 | 9/2002 | Dobbertin | |
| 2002/0079640 | A1 * | 6/2002 | Yoshie | G03G 15/6541 271/176 |
| 2005/0051016 | A1 * | 3/2005 | Mori | B26D 7/015 83/651 |
| 2005/0263958 | A1 | 12/2005 | Knierim | |
| 2006/0017214 | A1 | 1/2006 | Inoue | |
| 2006/0065358 | A1 * | 3/2006 | Cupp | B26D 1/09 156/304.6 |
| 2006/0163801 | A1 | 7/2006 | deJong | |
| 2008/0030811 | A1 | 2/2008 | Nishitani | |
| 2008/0240820 | A1 | 10/2008 | deJong | |
| 2009/0243201 | A1 | 10/2009 | Isogai | |
| 2010/0101439 | A1 | 4/2010 | Funk et al. | |
| 2012/0025457 | A1 | 2/2012 | Inoue | |
| 2012/0133093 | A1 | 5/2012 | Saito | |
| 2012/0277706 | A1 | 11/2012 | Marinelli | |
| 2013/0026706 | A1 | 1/2013 | Hirota | |
| 2013/0134662 | A1 | 5/2013 | Moriya | |
| 2014/0093298 | A1 * | 4/2014 | Nakamura | G03G 15/6582 83/72 |
| 2015/0174780 | A1 | 6/2015 | Newell | |
| 2018/0273325 | A1 | 9/2018 | Bhide | |

FOREIGN PATENT DOCUMENTS

| | | | | |
|---|---|---|---|---|
| CN | 105936066 | A | 9/2016 | |
| CN | 108463352 | A | 8/2018 | |
| EP | 1040926 | A1 | 10/2000 | |
| EP | 1332847 | A2 | 8/2003 | |
| EP | 2738606 | A1 | 6/2014 | |
| EP | 2875890 | A1 | 5/2015 | |
| EP | 3401734 | A1 * | 11/2018 | G03F 7/3057 |
| EP | 4041507 | B1 | 5/2023 | |
| JP | S62181398 | U | 11/1987 | |
| JP | 2007083318 | A | 4/2007 | |
| JP | 2013237538 | A * | 11/2013 | B41C 1/003 |
| JP | 2017104918 | A | 6/2017 | |
| JP | 6732903 | A * | 7/2020 | B41C 1/003 |
| WO | 03072474 | A2 | 9/2003 | |
| WO | 2016030450 | A1 | 3/2016 | |
| WO | 2019206911 | A1 | 10/2019 | |

OTHER PUBLICATIONS

European Communication of a Notice of Opposition for European Patent 4041507, Feb. 29, 2024, 8 pages.
Cyrel Punch, "DuPont Cyrel Punch Leaflet," The miracles of science, 2008, 2 pages.
www.worldofprint.com, "World of Print—CTP-Computer to Plate," Aug. 5, 2017, [cited Feb. 27, 2024], 3 pages. [online source] URL: https://www.worldofprint.de/2017/08/05/zu-seinem-20jaehrigen-jubilaeum-hat-inci-flex-einen-wegweisenden-vollautomatischen-prozess-zur-herstellung-von-flexodruckplatten-vorgestellt-der-eine-hohe-qualitaet-standardisierung-und-produktivitaet/.
D22b affidavit Riccardo de Caria, "Declaration in lieu of an Oath," MB&P Ref.: E02350EPOP, Jun. 2017, 4 pages.
International Search Report for International Application No. PCT/EP2020/078203, filed on Oct. 8, 2020, 9 pages.
European Consolidated List—Konsolidierte Liste—Liste Recapitulative for EP Application No. 20785994.3, Feb. 29, 2004, 1 pages.

* cited by examiner

PUNCHING STATION AND METHOD FOR A RELIEF PLATE PRECURSOR

This application is a national stage filing under 35 U.S.C. 371 of pending International Application No. PCT/EP2020/078203, filed Oct. 8, 2020, which claims priority to Netherlands Patent Application No. 2023988, filed Oct. 10, 2019, the entirety of which applications are incorporated by reference herein.

FIELD OF INVENTION

The field of the invention relates to a punching station, a punching method, and apparatus and methods for preparing and/or treating a relief plate precursor, in particular a printing plate precursor.

BACKGROUND

Washer apparatus for printing plate precursors are known. Typically, a transport bar is used to move a printing plate precursor through such a washer apparatus. To that end an area of the printing plate precursor is provided with a series of through holes in a punching station. Next an operator couples the pre-perforated printing plate precursor to a transport bar having a plurality of pins which can extend in the holes of the printing plate. The transport bar with the coupled plate is then brought by the operator to an inlet side of the washer apparatus. The transport bar leaves the washer apparatus at an outlet side, where it is recuperated by an operator who decouples it from the printing plate precursor. These steps are repeated for the next printing plate precursor to be washed.

Such a washer apparatus is disclosed in US 2018/0217502. A transport strip is attached to the flexographic printing element. To that end, the flexographic printing element is first perforated, and next the pins of the transport strip are arranged in the perforations.

Another example of a washer apparatus is disclosed in PCT application PCT/EP2019/060370 in the name of the applicant.

A disadvantage of the known apparatus and methods is that the plates have to be positioned in the punching station in a well-aligned manner in order to avoid that the plate tears or is damaged, resulting in transport problems requiring an operator intervention.

SUMMARY

The object of embodiments of the invention is to provide a punching station for arranging one or more penetration elements in or through an edge portion, typically a portion of the leading edge, of a relief plate precursor (P) or for arranging one or more perforations in an edge portion of a relief plate precursor in an improved manner with less risk of misalignment.

According to a first aspect of the invention, there is provided a punching station for arranging one or more penetration elements in or through an edge portion, typically a portion of the leading edge, of a relief plate precursor (P) or for arranging one or more perforations in an edge portion of a relief plate precursor. The punching station is intended to couple the edge portion directly to a transport bar provided with the one or more penetration elements, or is intended to arrange perforations or holes in the edge portion, whereupon a transport bar may be coupled to the perforated edge portion in a later step. The punching station comprises a punching means, an abutment means, a detection means, and a signalling means. The punching means comprises one or more penetration elements or perforating elements and is configured for arranging the one or more penetration elements or perforating elements through or in an edge portion of the relief plate precursor. The abutment means is aligned with the punching means and configured for forming an abutment for the edge of the relief plate precursor. The detection means is configured to detect at two or more locations along the abutment means whether the edge portion of the relief plate precursor is correctly positioned against the abutment means. The signalling means is configured to communicate a signal in function of the detection by the detection means.

By detecting at two or more locations along the abutment means whether the edge portion of the relief plate precursor is correctly positioned against the abutment means, it can be determined whether the entire edge portion is correctly positioned in a position ready for punching. By further including signalling means to communicate a signal based on the detection of the detection means, this signal can be used to decide whether or not to operate the punching means. The punching means may be configured to be manually operated or to be automatically operated. For example, the punching means may be automatically activated to perform a punching action when the signal indicates that the positioning of the edge portion is correct. By ensuring that the punching is correct it can be ensured that the relief plate precursor is attached correctly to a transport bar, so that tearing of the relief plate precursor or other damage of the relief plate precursor is avoided. Also, when the transport bar with the coupled relief plate precursor is transported through a machine for treatment of the precursor, a correct punching contributes to a good alignment of relief plate precursor whilst being transported through the machine.

Preferably, the signalling means is configured to communicate the signal to the punching means. For example, the punching means is configured such that the punching action is triggered automatically upon receipt of a signal from the signalling means indicating a correct positioning of the edge portion of the relief plate precursor. In another example, the punching means comprises a locking mechanism configured to allow punching action when the locking mechanism is in an unlocked state and the prevent a punching action when the locking mechanism is in an locked state. The punching means may then be configured such that the locking mechanism is put from a locked state into an unlocked state when receiving a signal from the signalling means indicating a correct positioning of the edge portion of the relief plate precursor, and back in a locked state after the punching action has been performed.

According to an exemplary embodiment, the punching station further comprises a signaling interface or an operator interface, and the signaling means is configured to communicate the signal to the signaling interface and/or operator interface. The signaling or operator interface may then be configured to generate an output based on said signal which can be sensed by an operator. The output may be e.g. a visual output or an audio output. For example, the signalling interface may include a light or a screen for indicating, e.g. with a colour or message or symbol, whether the edge portion of a relief plate precursor is correctly positioned. For example, a green light may indicate a correct positioning and a red light may indicate an incorrect positioning. Such an embodiment may be useful e.g. when the punching is done manually as it indicates to the operator whether the relief plate precursor is correctly positioned.

According to an exemplary embodiment, the abutment means comprises at least a first and a second abutment part which is movably arranged, such that when the edge portion is correctly positioned at the first location the first abutment part is in a first position and when it is not correctly positioned it is in a second position, and such that when the edge portion is correctly positioned at the second location the second abutment part is in a first position and when it is not correctly positioned it is in a second position. For example, the first and the second abutment part may be pivotable between the first and the second position. The detections means may then comprise a first and a second detector configured to detect a position of the first and the second abutment part, respectively.

The detection means may comprise any one of the following: an optical detection means, a proximity detection means, a pressure detection means, an electrical detection means, a magnetic detection means, a mechanical detection means, a ferrous/non-ferrous metal detection means, or a combination thereof. Examples of suitable detection means include a proximity switch, a photo-sensor, a mechanical switch, a magnetic switch, a camera, etc. In exemplary embodiments the detections means comprise a first and a second detector to perform a detection at the first and the second location, respectively. However, certain detection means such as a camera could look both at the first and the second location, either sequentially or simultaneously.

According to an exemplary embodiment, the abutment means comprises a plurality of alignment pins arranged in a row such that they can extend along the edge portion of the relief plate precursor. The advantage of using pins is that they can easily extend through a transport bar by providing the transport bar with a corresponding plurality of recesses or holes or channels. However, the abutment means may also comprise a wall portion. In such an embodiment the transport bar could be provided with a slit through which the wall portion may extend. One or more first pins of the plurality of pins may be associated with the first abutment part, and one or more second pins of the plurality of pins may be associated with the second abutment part. For example, the first pins may be fixed in a first pivotable carrier of the first abutment part, and the second pins may be fixed in a second pivotable carrier of the second abutment part. In order to limit and guide the movement of the first and second abutment parts, the alignment pins may extend through holes of a fixed guidance plate.

Preferably, the penetration elements are arranged on a transport bar, and the punching station is configured to receive the transport bar in a position aligned with the abutment means.

According to an exemplary embodiment, the punching means comprises a drive means configured to arrange the one or more penetration elements or perforating elements through or in an edge portion of the relief plate precursor. The drive means may be e.g. a hammer arranged movably such that it can be engaged against the edge portion of the relief plate precursor in order to arrange the one or more penetration elements or perforating elements through or in an edge portion of the relief plate precursor. The hammer may be provided with one or more holes corresponding with the one or more penetration elements or perforation elements. The transport bar may be arranged to be positioned with the one or more penetration elements on one side of the edge portion, and the hammer may be arranged to engage the other side of the edge portion.

More preferably, each penetration element has a sharp tip or edge capable of causing a penetrating action in the material of the relief plate precursor, and the punching station is configured to cause a penetration by the at least one penetration element at least partially into or through an unperforated area near an edge of a relief plate precursor. In that manner, the penetration elements are pushed in the material of the relief plate precursor without generating waste. The penetration elements can be made from any hard material which can penetrate into or through the plate precursor material. It can be made from metals or alloys, ceramics, polymers, glass, or combinations thereof. Preferably they are made from metals or alloys. Each penetration element comprises a penetration portion having a length, seen in a penetration direction, between 1 mm and 20 mm. Preferably, the penetration portion has a maximum dimension, seen in a direction perpendicular on the penetration direction, which is smaller than 5 mm, more preferably smaller than 3 mm. For example, when the penetration portion has a round cross section, the diameter is preferably smaller than 5 mm, more preferably smaller than 3 mm.

According to an exemplary embodiment, the abutment means is arranged in a movable manner, such that it can be moved away when the punching means is activated. Alternatively, the hammer may be provided with holes for receiving a portion of the abutment means.

According to an exemplary embodiment, the first and the second location along the abutment means correspond with a location of a left and right side of the middle of the edge portion of the relief plate precursor, respectively. In that manner an accurate detection can be performed.

According to another aspect of the invention, there is provided an apparatus for treating a relief plate precursor comprising a transport system, a punching station according to any one of the embodiments described above, and a treatment compartment. The transport system is provided with at least one, preferably at least two transport bars. The punching station is configured for coupling an edge of a relief plate precursor to a transport bar of the at least one transport bar. The treatment compartment is configured for treating the relief plate precursor.

Preferably, the transport system is configured for transporting the relief plate precursor such that a leading edge of the relief plate precursor touches the abutment means, and such that the signalling means triggers the punching means.

Optionally, the apparatus further comprises a decoupling station configured to decouple the relief plate precursor from the transport bar, wherein the transport system is configured to move the transport bar from an outlet side of the treatment compartment through a discharge zone to the decoupling station such that the relief plate precursor can be discharged in the discharge zone after being decoupled from the transport bar.

Optionally, the apparatus further comprises a removal means configured to remove a treated relief plate precursor after being decoupled from the transport bar in the decoupling station.

Optionally, the transport system comprises a forward transport mechanism configured to transport the transport bar with the coupled relief plate precursor at least from an inlet side to an outlet side of the treatment compartment, and from the outlet side to the decoupling station.

Optionally, the transport system further comprises a bar coupling means configured to couple the transport bar with coupled relief plate precursor to the forward transport mechanism.

Optionally, the transport system comprises a backward transport mechanism configured to transport the transport bar from the decoupling station back to the coupling station.

Optionally, the apparatus further comprises a control unit configured to control the transport system, such that the at least two transport bars move simultaneously through the apparatus, wherein optionally the signalling means may be part of the control unit.

The length of the transport bar may be from 100 mm to 10000 mm.

The treatment compartment may comprise any one of the following: flat or cylindrical brushes, pumps, spraying means, sensors, filters, rinsing means, motors, gears, heating means, cooling means, rollers, belts, webs, or combinations thereof.

The transport system may comprise any one of the following: one or more belts, one or more chains, one or more lead screws, a linear motor, magnetic means, electromagnetic means, clamping means, vacuum means, or combinations thereof.

According to yet another aspect of the invention, there is provided a punching method for arranging one or more penetration elements in or through an edge portion of a relief plate precursor or for arranging one or more perforations in an edge portion of a relief plate precursor, said relief plate precursor preferably comprising a substrate layer and at least one photosensitive layer (optionally an integral mask layer), said punching method being performed in a punching station and comprising the steps of:

- bringing a relief plate precursor with a leading edge against an abutment means;
- detecting at two or more locations along the abutment means by a detection means, whether the edge portion of the relief plate precursor is correctly positioned against the abutment means;
- automatically communicating a signal in function of the detection by the detection means;
- arranging the one or more penetration elements or perforating elements through or in an edge portion of the relief plate precursor when a signal indicating a correct positioning at the first and the second location has been communicated.

According to an exemplary embodiment, the one or more penetration elements are attached to a transport bar, and the method further comprises the steps of

- transporting the transport bar with the attached relief plate precursor through a treatment zone whilst removing soluble or liquefiable material and establishing a relief in the relief plate precursor,
- detaching the relief plate precursor form the transport bar in a decoupling station,
- optionally transporting the transport bar back to the punching station.

According to an exemplary embodiment, the transport bar is moved in a closed loop from the punching station through the treatment zone to the decoupling station and back to the coupling station.

According to an exemplary embodiment, the at least two transport bars are being transported simultaneously in the treatment apparatus.

According to an exemplary embodiment, the transport speed through the treatment compartment is different form the transport speed of the transport bar moving back to the coupling station.

According to an exemplary embodiment, the treatment in the treatment compartment is selected from the group comprising washing, brushing, rinsing, spraying, drying, irradiating, developing, heating, cooling, removing of material, treating with gases or liquids, sanding, cutting, treating with electromagnetic waves, and combinations thereof.

According to an exemplary embodiment, the treatment in the treatment compartment is a heat treatment resulting in a liquefied part of relief plate precursor followed by contacting the liquefied part with a moving acceptor material, such as a web, a non woven material, or a foil to which molten material adheres, and continuously removing the liquefied part with the acceptor material.

According to an exemplary embodiment, the method further comprises the step of performing a post-treatment on the relief plate precursor, said post-treatment being selected from the group comprising washing, brushing, rinsing, spraying, drying, irradiating, developing, heating, cooling, removing of material, treating with gases or liquids, sanding, cutting, treating with electromagnetic waves and combinations thereof.

According to an exemplary embodiment, the method further comprises the step of performing a pre-treatment on the relief plate precursor, said pre-treatment being selected from the group comprising: cutting, ablation, exposure to electromagnetic radiation, and combinations thereof.

BRIEF DESCRIPTION OF THE FIGURES

The accompanying drawings are used to illustrate presently preferred non limiting exemplary embodiments of the apparatus and method of the present invention. The above and other advantages of the features and objects of the invention will become more apparent and the invention will be better understood from the following detailed description when read in conjunction with the accompanying drawings, in which:

FIGS. 6C and 6D illustrate the arrangement of FIG. 6A whilst moving a hammer tool downward in the direction of the relief plate precursor, wherein FIG. 6D illustrates the situation where the plurality of penetration elements of the transport bar extend through an area near an edge of the relief plate precursor;

DETAILED DESCRIPTION OF EMBODIMENTS

Figure 1:
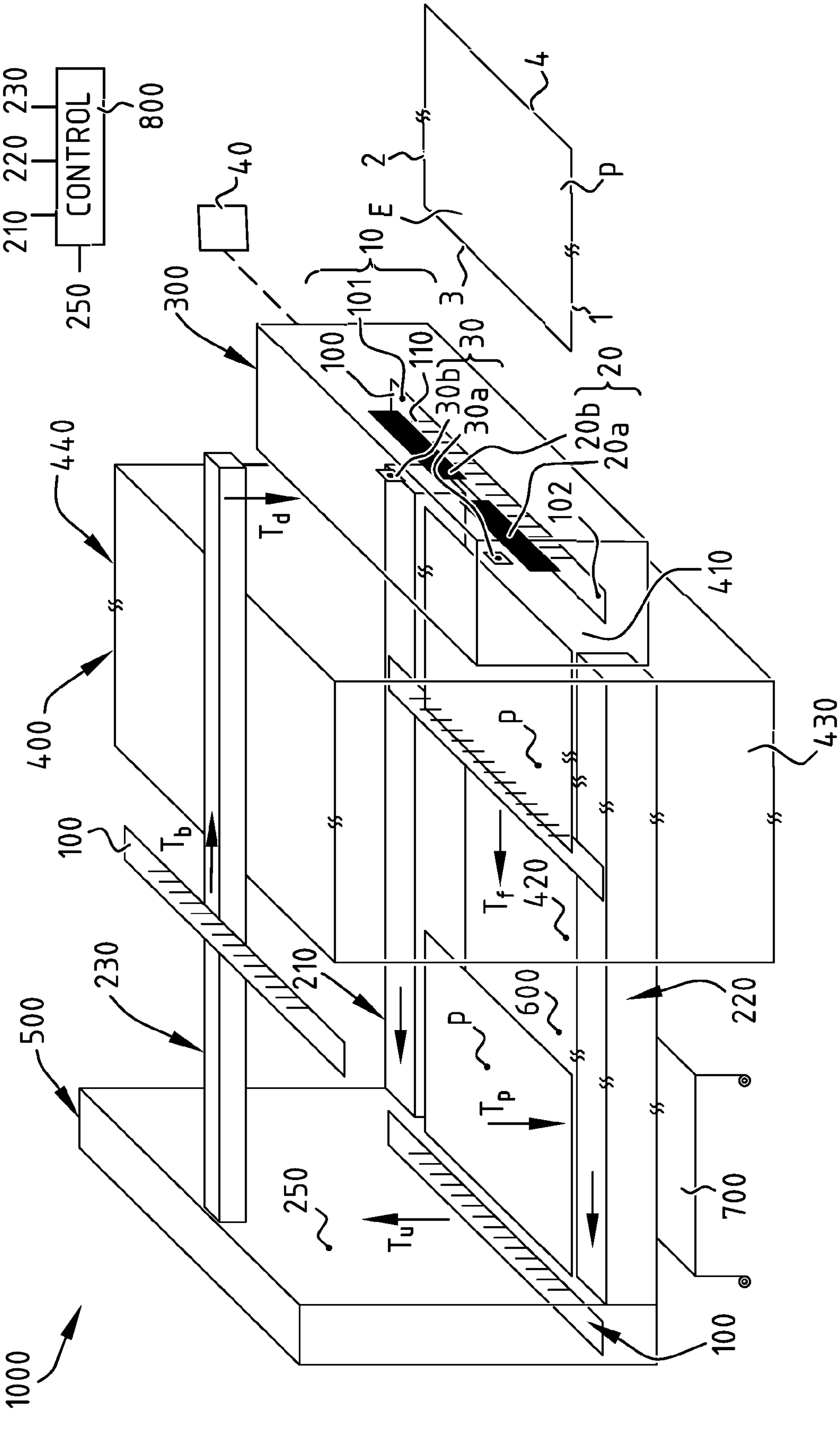
FIG. 1 is a schematic perspective view of an exemplary embodiment of an apparatus for treating a relief plate precursor.

FIG. 1 illustrates schematically an apparatus 1000 for treating a relief plate precursor, such as a printing plate precursor P. The apparatus is for instance a washing apparatus for washing a relief plate precursor with a liquid. However, also other treatments are possible such as brushing, rinsing, spraying, drying, irradiating, developing, heating, cooling, removing of material of the relief plate precursor, treating the relief plate precursor with gases or liquids, sanding the relief plate precursor, cutting the relief plate precursor, treating it with electromagnetic waves, or combinations thereof.

The apparatus 1000 comprises a transport system 210, 220, 230 with at least one, preferably at least two, and even more preferably at least three transport bars 100 intended to be coupled to a relief plate precursor P. For example, four transport bars 100 may be provided to the transport system 210, 220, 230 as illustrated in FIG. 1. The transport bar 100 is coupled to a leading edge 3 of the relief plate precursor P in a punching station 300 and preferably extend over more than the entire length of the leading edge 3, such that end parts of the transport bar 100 can be coupled to a transport mechanism, see further. It is noted that it is also possible to couple a plurality of relief plate precursors to the transport bar 100. Preferably, the length of the transport bar 100 is between 100 mm and 1000 mm, more preferably between 1000 mm and 4000 mm.

The apparatus 1000 comprises a punching station 300 configured for coupling a relief plate precursor P to a transport bar 100, a treatment compartment 400 configured for treating the relief plate precursor whilst the transport bar 100 to which the relief plate precursor P is coupled, is moved through the treatment compartment 400, and a plate decoupling station 500 configured for decoupling the treated relief plate precursor P from the transport bar 100. The transport system 210, 220, 230 is configured to automatically move each transport bar 100, after being coupled to a relief plate precursor P in the punching station 300, from the punching station 300 through the treatment station 400 to the plate decoupling station 500, and, after being decoupled from a treated relief plate precursor P, from the plate decoupling station 500 back to the punching station 300, such that the transport bar 100 moves in a closed loop through the apparatus 1000. In the illustrated example of FIG. 1, four transport bars 100 circulate in the apparatus 1000.

In a preferred embodiment, each transport bar 100 is provided with a plurality of penetration elements 110 (here in the form of pins or rods), and the punching station 300 is configured to engage the plurality of penetration elements 110 in an area near the leading edge 3 of the relief plate precursor P. In FIG. 1, the relief plate precursor P has a leading edge 3, a trailing edge 4, both perpendicular to a forward transport direction Tf of the relief plate precursor P through the apparatus 1000, and two side edges 1, 2 parallel to the forward transport direction Tf. An area near the leading edge 3 of the relief plate precursor P is coupled to the plurality of penetration elements 110 of the transport bar 100.

The punching station 300 is configured for arranging the plurality of penetration elements 110 in an edge portion E of the relief plate precursor P. The punching station 300 comprises a punching means 10 comprising the plurality of penetration elements 110 and a drive means such as a hammer (not shown) configured to arrange one or more penetration elements 110 in an edge portion of the relief plate precursor P. The punching station 300 further comprises an abutment means 20 aligned with the punching means 10 and configured for forming an abutment for the edge 3 of the relief plate precursor P. The punching station 300 also comprises a detection means 30 configured to detect at two or more locations along the abutment means 20 whether the edge portion E of the relief plate precursor is correctly positioned against the abutment means 20, and a signaling means 40 configured to communicate a signal in function of the detection by the detection means 30. Preferably, the signaling means 40 is configured to communicate the signal to the punching means 10, e.g. in order to automatically trigger the punching means 10 and in particular the drive means of the punching means 10 so that one or more penetration elements 110 are arranged in an edge portion E of the relief plate precursor P.

The treatment compartment 400 has an inlet side 410 and an outlet side 420. A transport bar 100 with a coupled relief plate precursor P is moved through the treatment compartment 400 from the inlet side 410 to the outlet side 420, wherein the transport bar 100 moves in the forward transport direction Tf. Between the outlet side 420 of the treatment compartment 400 and the plate decoupling station 500, there is provided a plate discharge zone 600. A relief plate precursor P is pulled by the transport system fully out of the treatment compartment 400 in the plate discharge zone 600 before being decoupled from the transport bar 100 in the decoupling station 500. In that way, when the relief plate precursor P is decoupled from the transport bar 100, the relief plate precursor P can be discharged in the plate discharge zone 600. At the bottom of the plate discharge zone 600 there may be provided a removal means configured to remove a treated relief plate precursor P after being decoupled from the transport bar 100 in the plate decoupling station 500. In the illustrated embodiment, the removal means 700 is a trolley configured for receiving the treated relief plate precursor P in the plate discharge zone 600, and for being moved out of the plate discharge zone 600, such that it can be easily transported away of the plate discharge zone. For example, if the apparatus 1000 is a washer, an operator may transport the washed relief plate precursor P to a dryer in order to dry the washed relief plate precursor. In other non illustrated embodiments, the removal means 700 may be a carrier, a robot, a moving belt, at least one rotating drum, etc. Also such devices can be configured to move a treated relief plate precursor P out of the plate discharge zone 600 after being decoupled in the plate decoupling station 500.

In the embodiment of FIG. 1, the transport system comprises a forward transport mechanism which comprises first mechanism 210 on one side of the apparatus 1000, and a second transport mechanism 220 on the other side of the apparatus 1000. The transport mechanism 210, 220 is configured to transport the transport bar 100 with a coupled relief plate precursor P at least from the inlet side 410 to the outlet side 420 of the treatment compartment 400, and from the outlet side 420 to the plate decoupling station 500, in the forward transport direction Tf. To that end, a first end 101 of the transport bar 100 is coupled with the first forward transport mechanism 210, and a second end 102 of the transport bar 100 is coupled with the second forward transport mechanism 220. The transport system may comprise a bar coupling means configured to couple the transport bar, and more in particular end 101 and the second end 102 of the transport bar to the first and second forward transport mechanism 210, 220. The bar coupling means may e.g. be configured for pushing or moving the transport bar 100 in the direction of the first and second forward transport mechanism, in order to cause a coupling of the end parts 101 and 102 of the transport bar 100 to the forward transport mechanism 210, 220. In the embodiment of FIG. 1, the treatment compartment 400 has a first and second opposite lateral side 430, 440 extending in the forward transport direction Tf, and the first and second forward transport mechanism 210, 220 extend at the first and second opposite lateral side 430, 440 of the treatment compartment 400, respectively.

Figure 2:
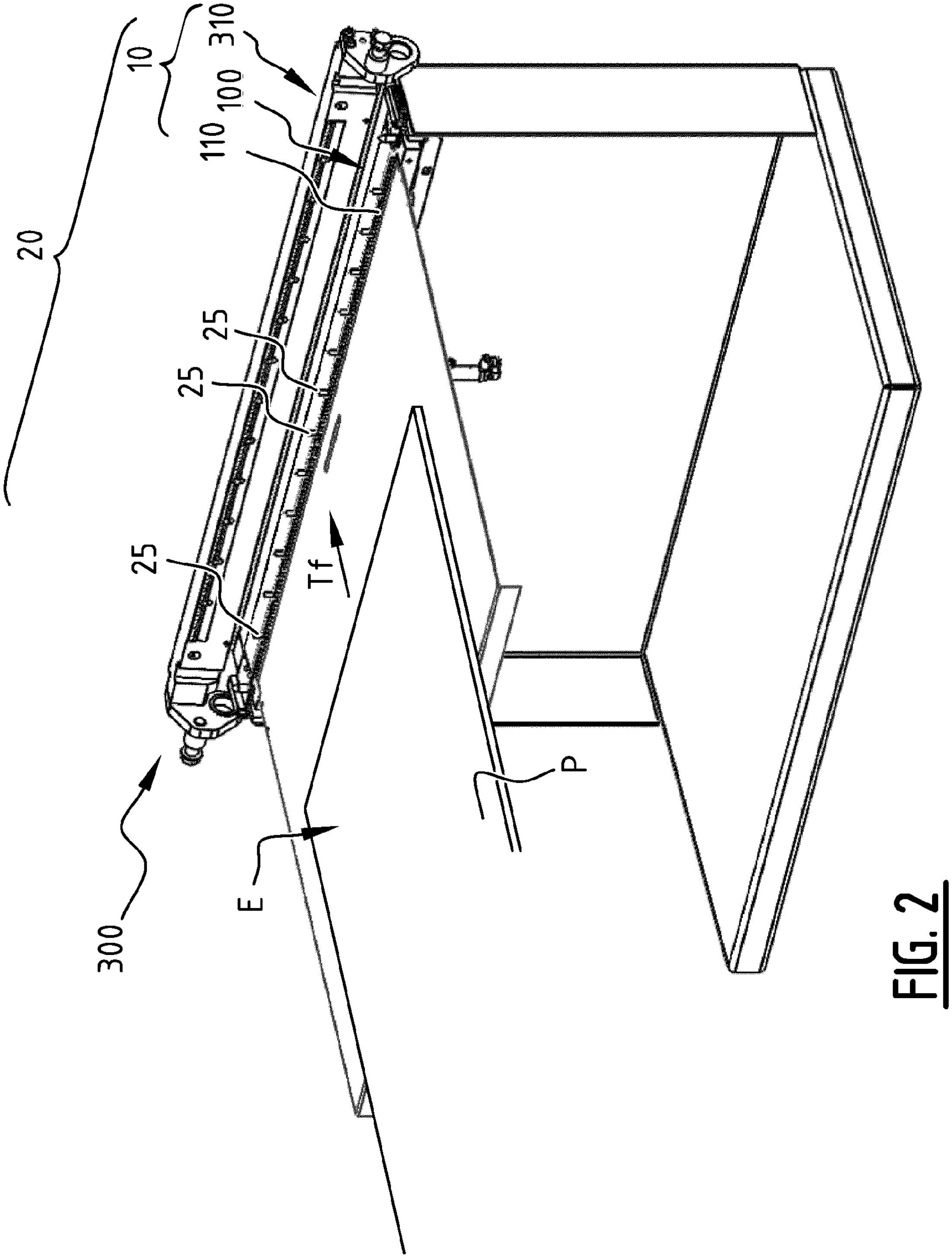
FIG. 2 is a schematic perspective view of an exemplary embodiment of a punching station.
Figure 6A:
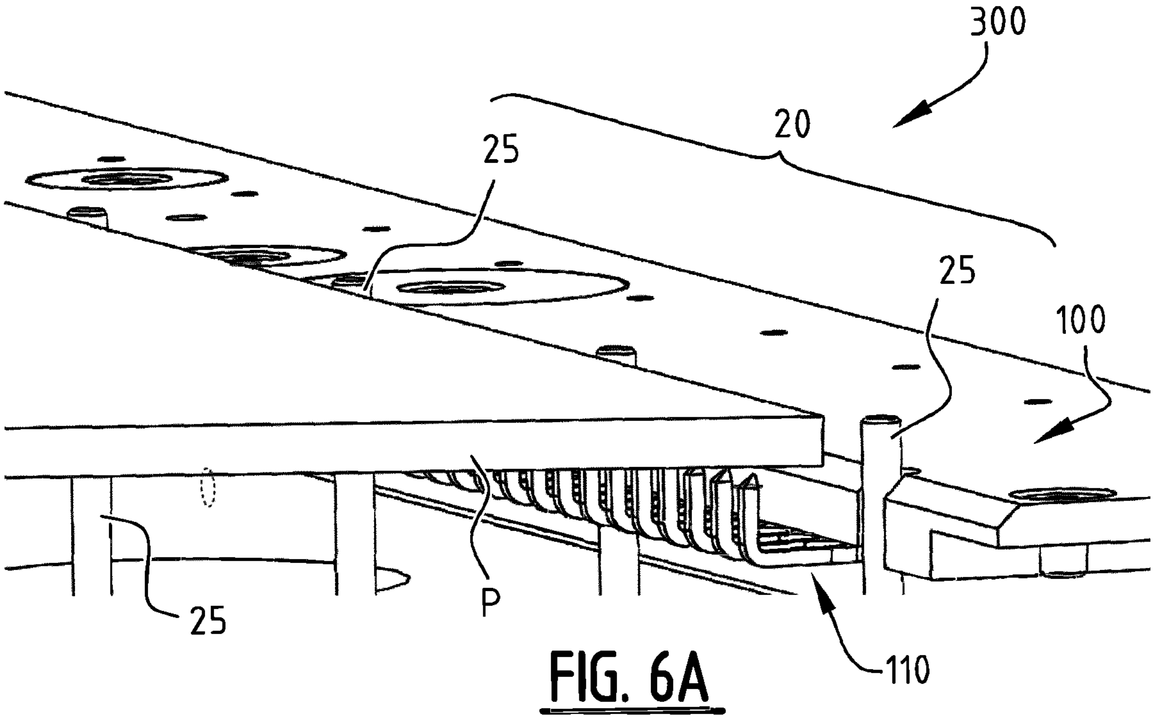
FIG. 6A is a schematic perspective view illustrating a relief plate precursor aligned with a transport bar.
Figure 6B:
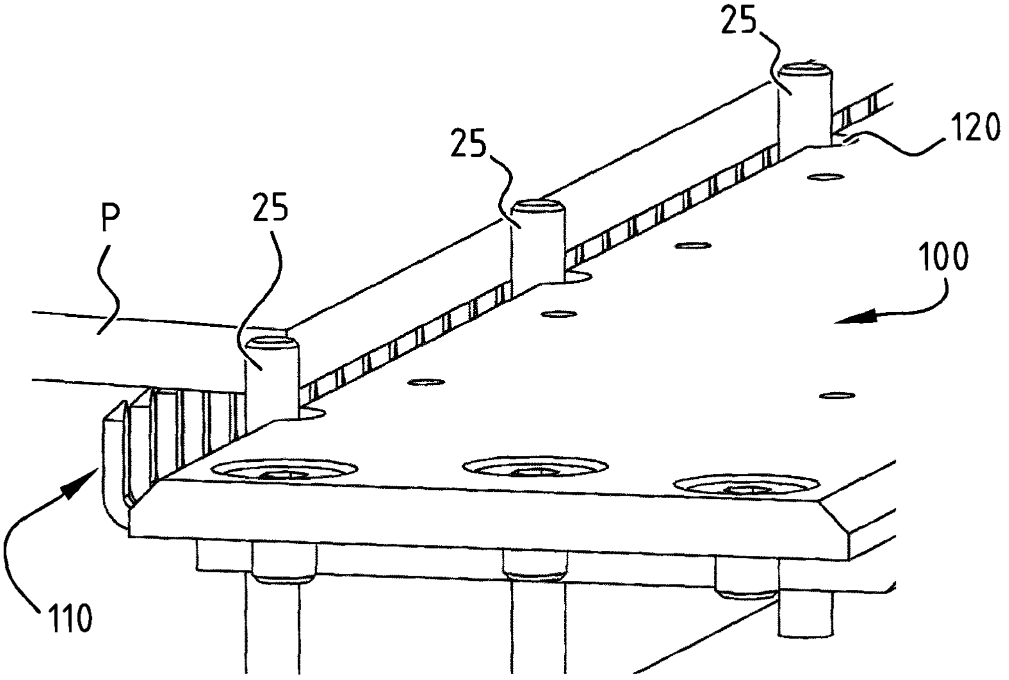
FIG. 6B is a detailed view seen from another side of the arrangement of FIG. 6A.
Figure 6C:
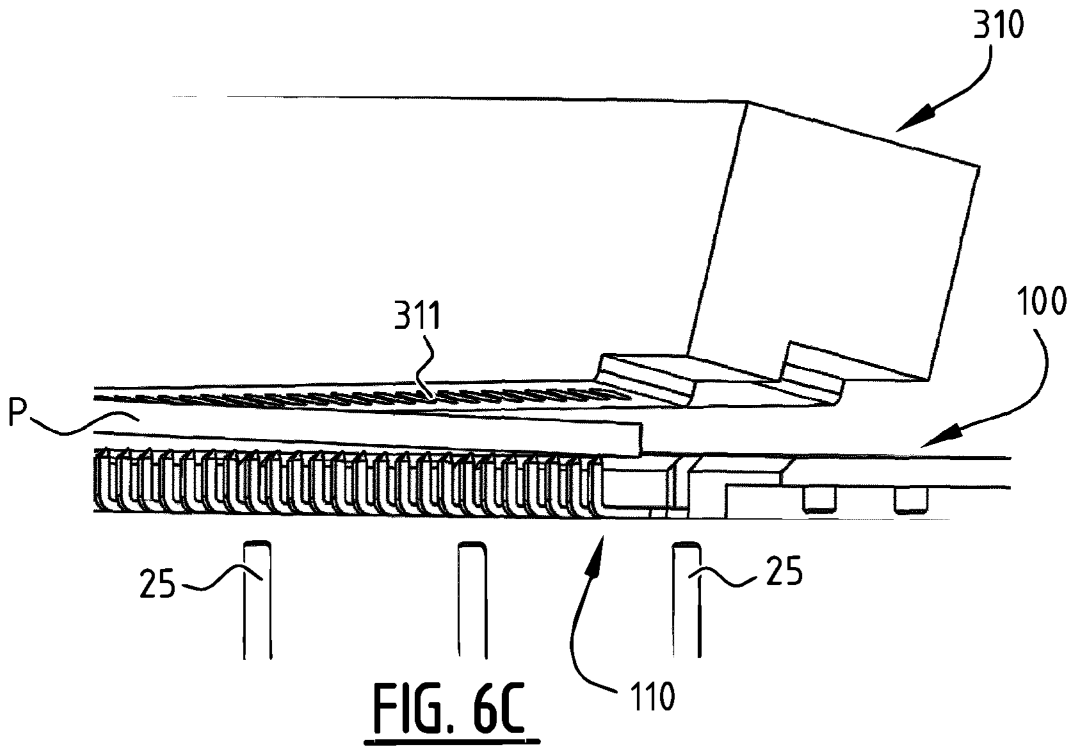
Figure 6D:
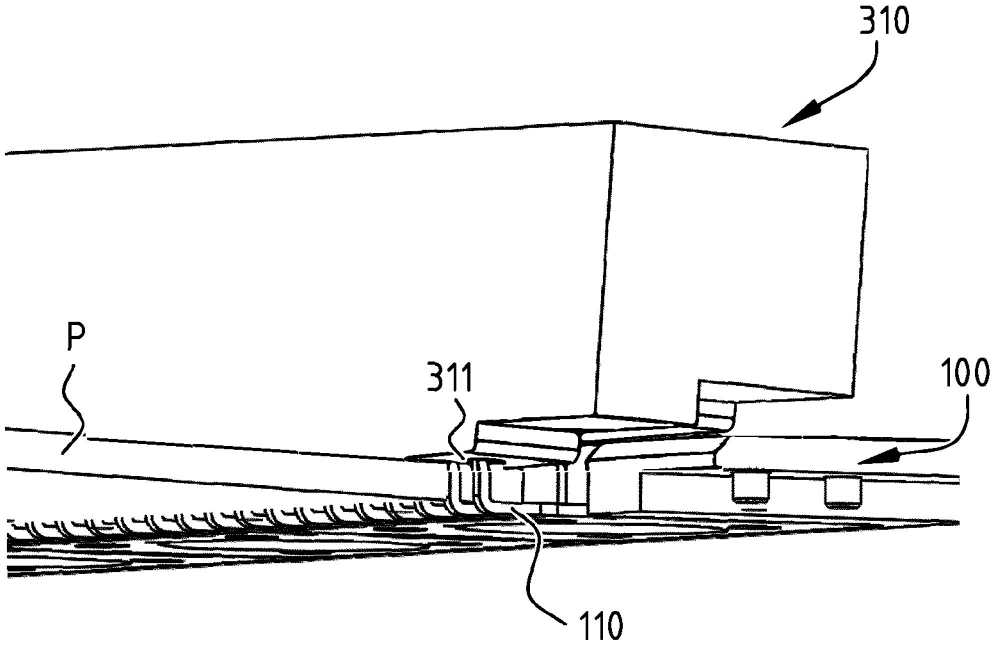
Figure 6E:
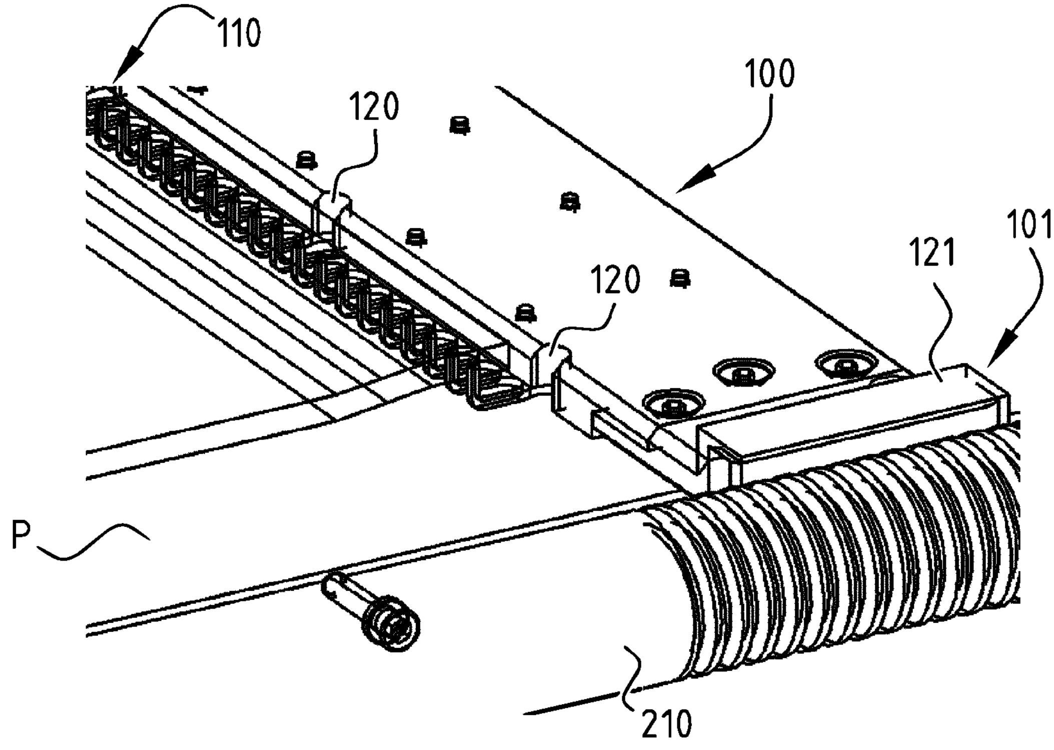
FIG. 6E illustrates the arrangement of FIG. 6D after the hammer tool has been removed.

The first forward transport mechanism 210 may comprise a first lead screw, and the first end 101 of the transport bar 100 may be provided with a first coupling portion 121 configured to be coupled to the first lead screw 210, see FIG. 6E which will be discussed below. In a similar manner, the second forward transport mechanism 220 may be provided with a second lead screw, which can be coupled to a second coupling portion 122. These first and second coupling portions 121, 122 are also illustrated in FIG. 2. However, in other embodiments, the first and/or second forward transport mechanism 210, 220 may comprise other transport means such as a chain or belt, and the first and second coupling portions 121, 122 may be adapted accordingly.

The transport system further comprises a backward transport mechanism 230 configured to transport the transport bar 100 from the plate decoupling station 500 back to the punching station 300. In the illustrated embodiment of FIG. 1, the backward transport mechanism 230 is located at an upper side of the apparatus 1000. However, in other embodiments, the backward transport mechanism 230 could be arranged in a lower portion of the apparatus 1000, below the forward transport mechanism 210, 220. A backward transport mechanism 230 may comprise any one of the following: one or more belts, one or more chains, one or more lead screws, a linear motor, or combinations thereof.

In FIG. 1, the backward transport mechanism 230 is arranged centrally above the treatment compartment 400. However, the backward transport mechanism 230 could also be realized with a first and second backward transport mechanism located at opposite lateral sides of the treatment compartment 400 above or below the first and second forward transport mechanism 210, 220. Alternatively, the backward transport mechanism may be located at a lateral side of the treatment compartment, and optionally the transport bar may be rotated and transported backward in a vertical position. However, in order to reduce the footprint of the apparatus the backward transport mechanism is preferably located above or below the first and second forward transport mechanism 210, 220.

As illustrated in FIG. 1, the backward transport mechanism 230 is located partly above the treatment compartment 400, and the transport system further comprises an upward transport mechanism 250 configured to move a decoupled transport bar 100 in the plate decoupling station 500 upward towards the backward transport mechanism 230. For example, the upward transport mechanism 250 may move the transport bar 100 in an upward direction Tu, typically a vertical direction, towards the backward transport mechanism 230 which moves the transport bar 100 in a backward transport direction Tb opposite to the forward transport direction Tf, back to the punching station 300. The upward transport mechanism 250 may comprise any one or more of the following: magnetic means, electromagnetic means, clamping means, vacuum means, linear motors, chains, belts, lead screws, piston or combinations thereof. In other embodiments where the backward transport mechanism 230 is located below the forward transport mechanism, there may be provided a downward transport mechanism. The downward transport mechanism may comprise any one or more of the following: magnetic means, electromagnetic means, clamping means, vacuum means, linear motors, chains, belts, lead screws, piston or combinations thereof, or occur simply by gravity.

FIGS. 2, 2A, 3, 4A, 4B, 5A and 5B illustrate in more detail a first exemplary embodiment of a punching station 300 for arranging the plurality of penetration elements 110 in an edge portion E of the relief plate precursor P. The punching station 300 comprises a punching means 10 comprising the plurality of penetration elements 110 and a drive means embodied as a hammer 310. The punching station 300 further comprises an abutment means 20 aligned with the punching means 10 and configured for forming an abutment for the edge 3 of the relief plate precursor P. The punching station 300 also comprises a detection means 30 configured to detect at two or more locations along the abutment means 20 whether the edge portion E of the relief plate precursor is correctly positioned against the abutment means 20, and a signaling means 40 configured to communicate a signal in function of the detection by the detection means 30. Preferably, the signaling means 40 is configured to communicate the signal to the punching means 10, e.g. in order to automatically trigger the hammer 310 so that one or more penetration elements 110 are arranged in an edge portion E of the relief plate precursor P.

Figure 4A:
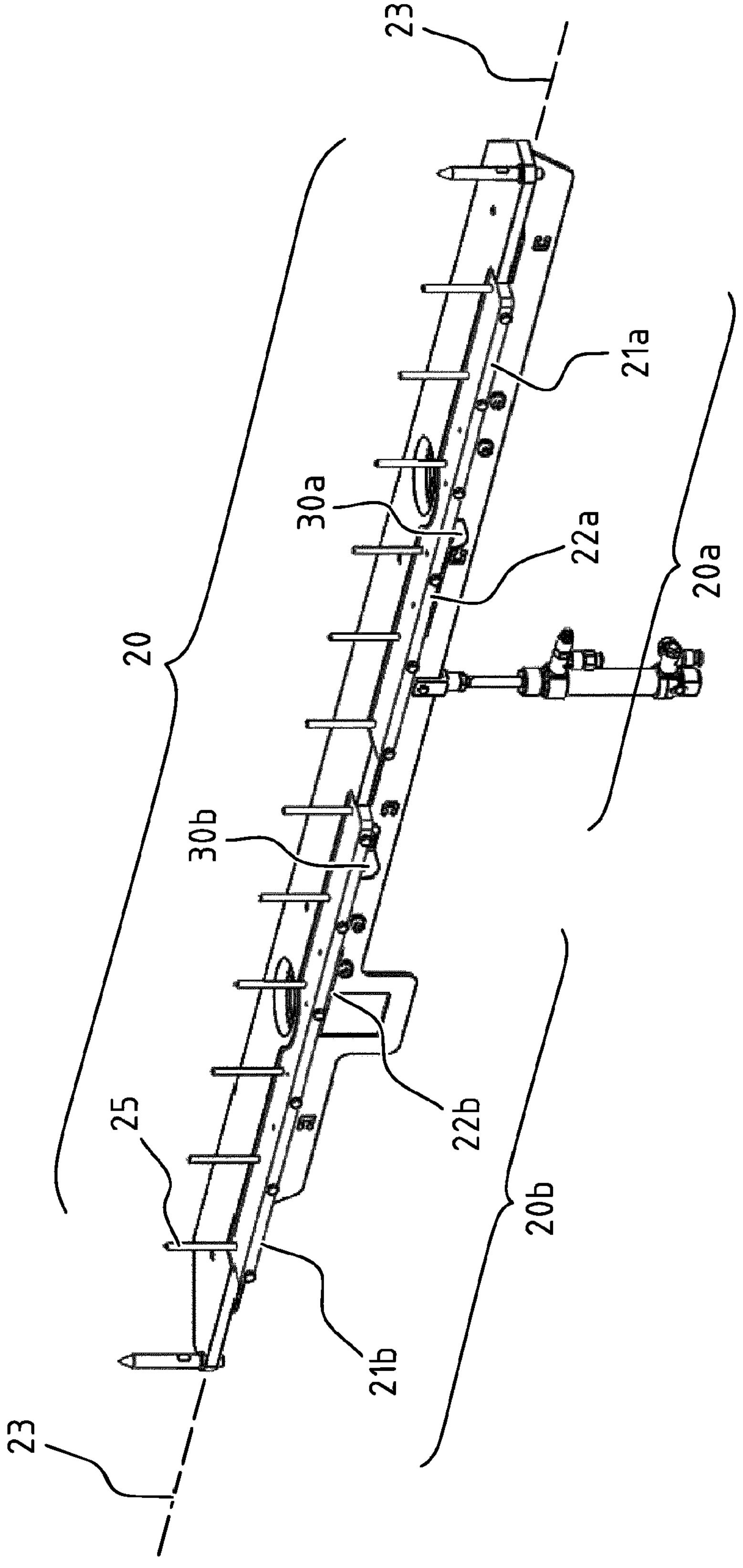
FIG. 4A is a schematic perspective view of a portion of the punching station of FIG. 2.
Figure 4B:
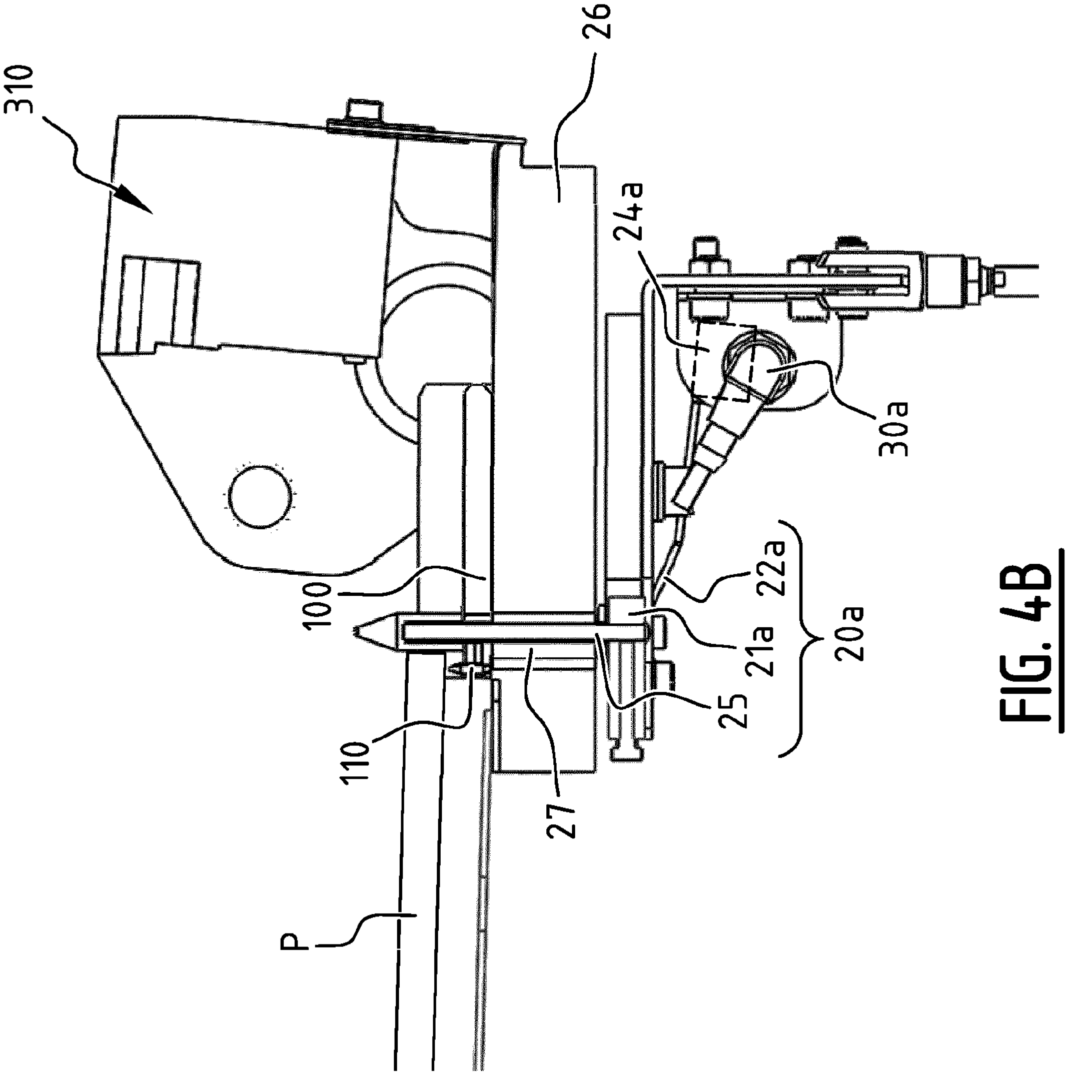
FIG. 4B is a cross-sectional view through a portion of the punching station of FIG. 2.
Figure 5A:
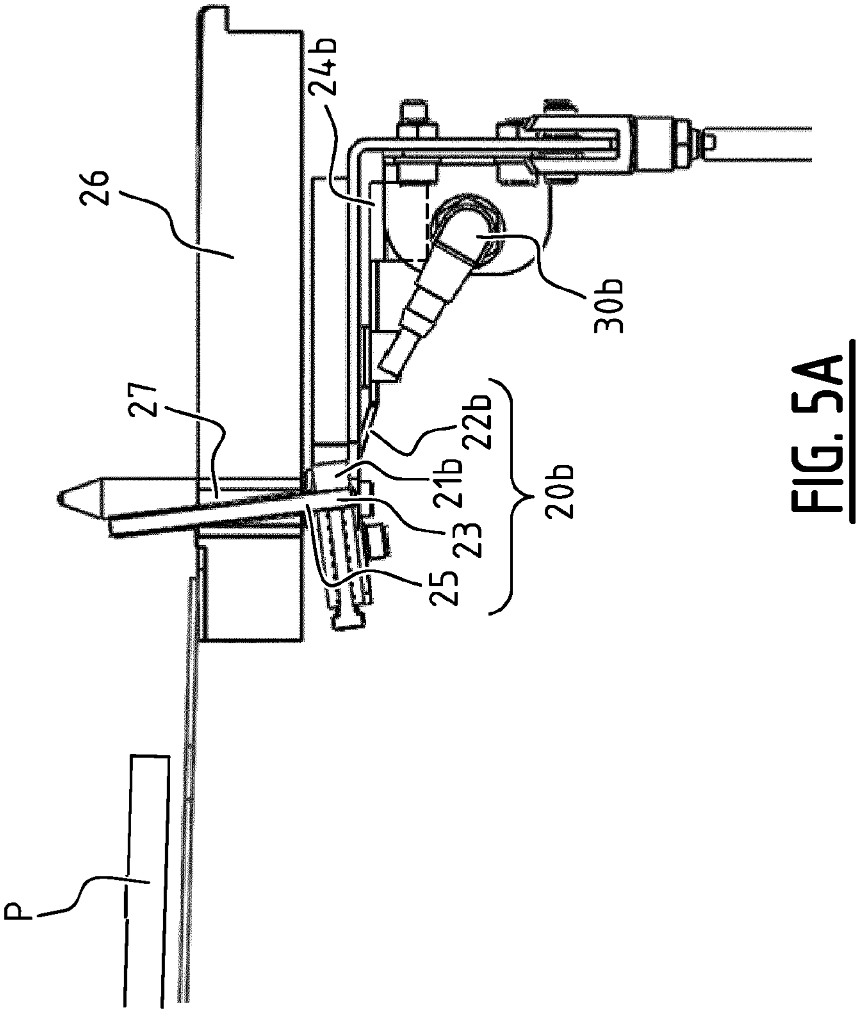
FIGS. 5A and 5B are cross-sectional view similar to the view of FIG. 4B, in a first and second state of the abutment means.
Figure 5B:
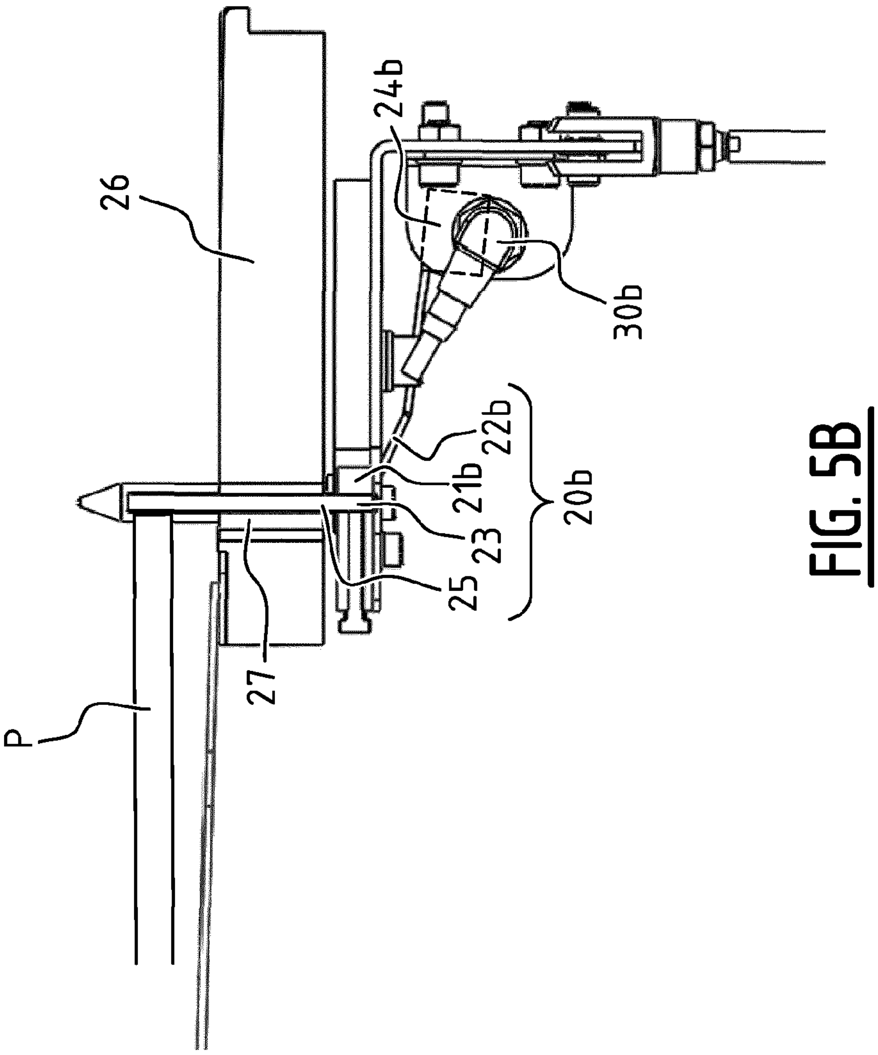

As shown in FIG. 4A, the abutment means 20 comprises at least a first and a second abutment part 20*a*, 20*b* which is movably arranged, such that when the edge portion E is correctly positioned at the first location, the first abutment part 20*a* is in a first position and when it is not correctly positioned it is in a second position, and such that when the edge portion is correctly positioned at the second location the second abutment part 20*b* is in a first position and when it is not correctly positioned it is in a second position. The first and the second position of the second abutment part 20*b* are shown in FIGS. 5B and 5A, respectively. In FIG. 5A the edge of the relief plate precursor P is at a distance from the abutment part 20*b*, and the abutment part 20*b* is inclined forward towards the relief plate precursor P. In FIG. 5B the edge of the relief plate precursor P is against the abutment part 20*b*, and the abutment part 20*b* is inclined backward. The change in position is detected by a detector 30*b* of the detector means. The first and the second abutment part 20*a*, 20*b* are pivotable around a horizontal axis 23 which extends parallel to a transverse direction (i.e. perpendicular on the movement direction Tf shown in FIG. 2) so that they can pivot from the first to the second position and vice versa.

The abutment means 20 comprises a plurality of alignment pins 25 arranged in a row such that they can extend along the edge portion E of the relief plate precursor. Each abutment part 20*a*, 20*b* may comprise one or more alignment pins 25. In the example of FIG. 4A, each abutment part 20*a*, 20*b* comprises six alignment pins 25. The alignment pins 25 are fixed in respective first and second pivotably mounted carriers 21*a*, 21*b* of the first and second abutment parts 20*a*, 20*b*, respectively. The carriers 21*a*, 21*b* are each provided with a respective bracket 22*a*, 22*b* having a portion 24*a*, 24*b*, the position of which is detectable by the detectors 30*a*, 30*b*, see FIGS. 5A and 5B. To limit the movement of the abutment parts 20*a*, 20*b*, there is provided a pin guidance plate 26 with a plurality of passages 27 through which the alignment pins 25 extend. The passages 27 are larger than the size of the pins 25, so that the pins can pivot between the first and the second position, wherein the wall delimiting the passages 27 limits the movement of the abutment parts 20*a*, 20*b*. The abutment parts 20*a*, 20*b* are shaped and dimensioned such that the abutment part 20*a*, 20*b* is inclined forward towards the relief plate precursor P when in the second position (FIG. 5A), and such that the abutment part 20*a*, 20*b* is inclined backward in the first position (FIG. 5B).

The detections means 30 comprises a first and a second detector 30*a*, 30*b* configured to detect a position of the first and the second abutment part 20*a*, 20*b*, respectively. The detection means may comprise any one of the following: an optical detection means, a pressure detection means, an electrical detection means, a mechanical detection means, or a combination thereof. In the illustrated example the first and second detectors 30*a*, 30*b* may be e.g. proximity sensors.

Figure 2A:
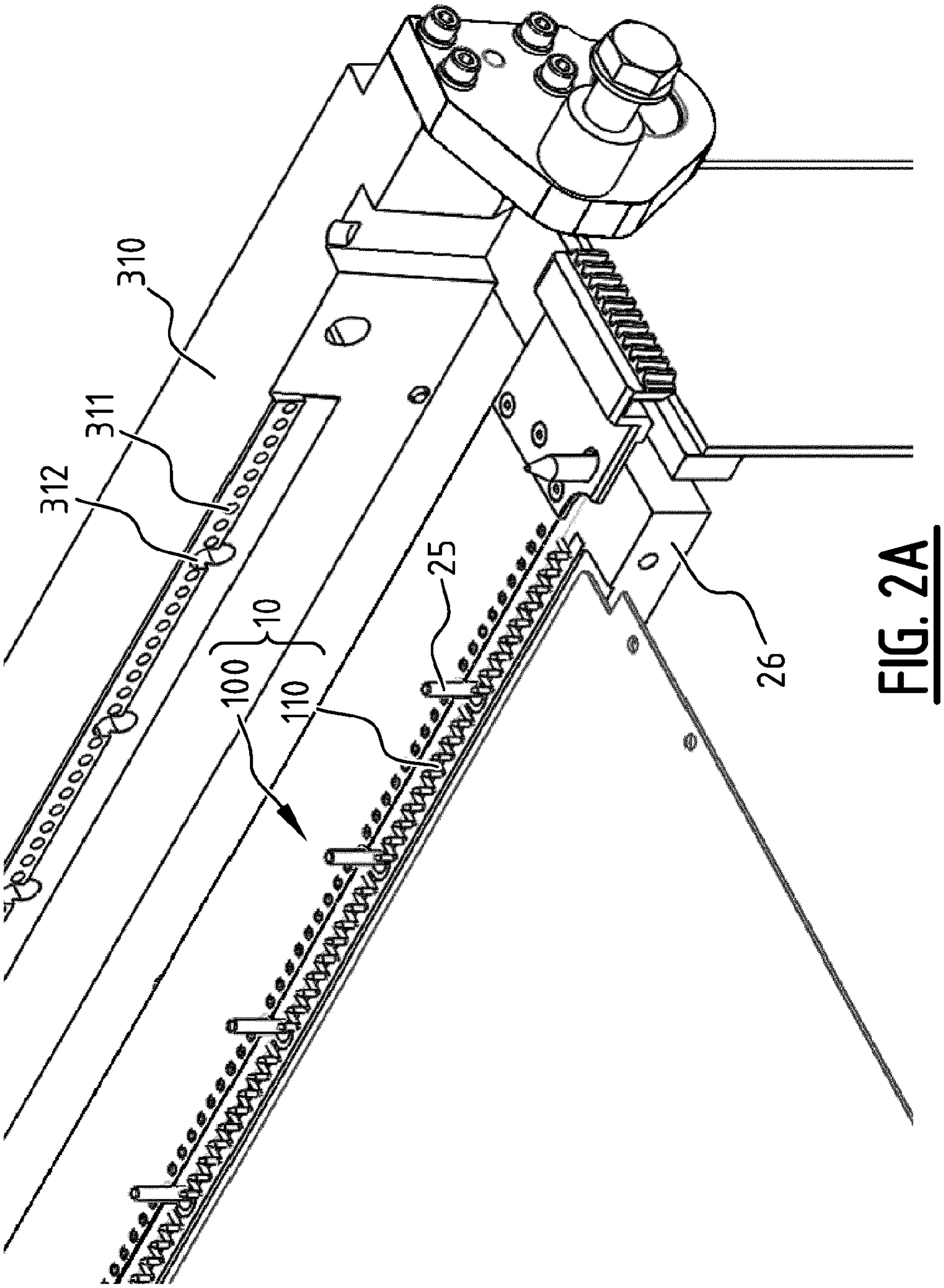
FIG. 2A is a detailed perspective view of a portion of the punching station of FIG. 2.
Figure 3:
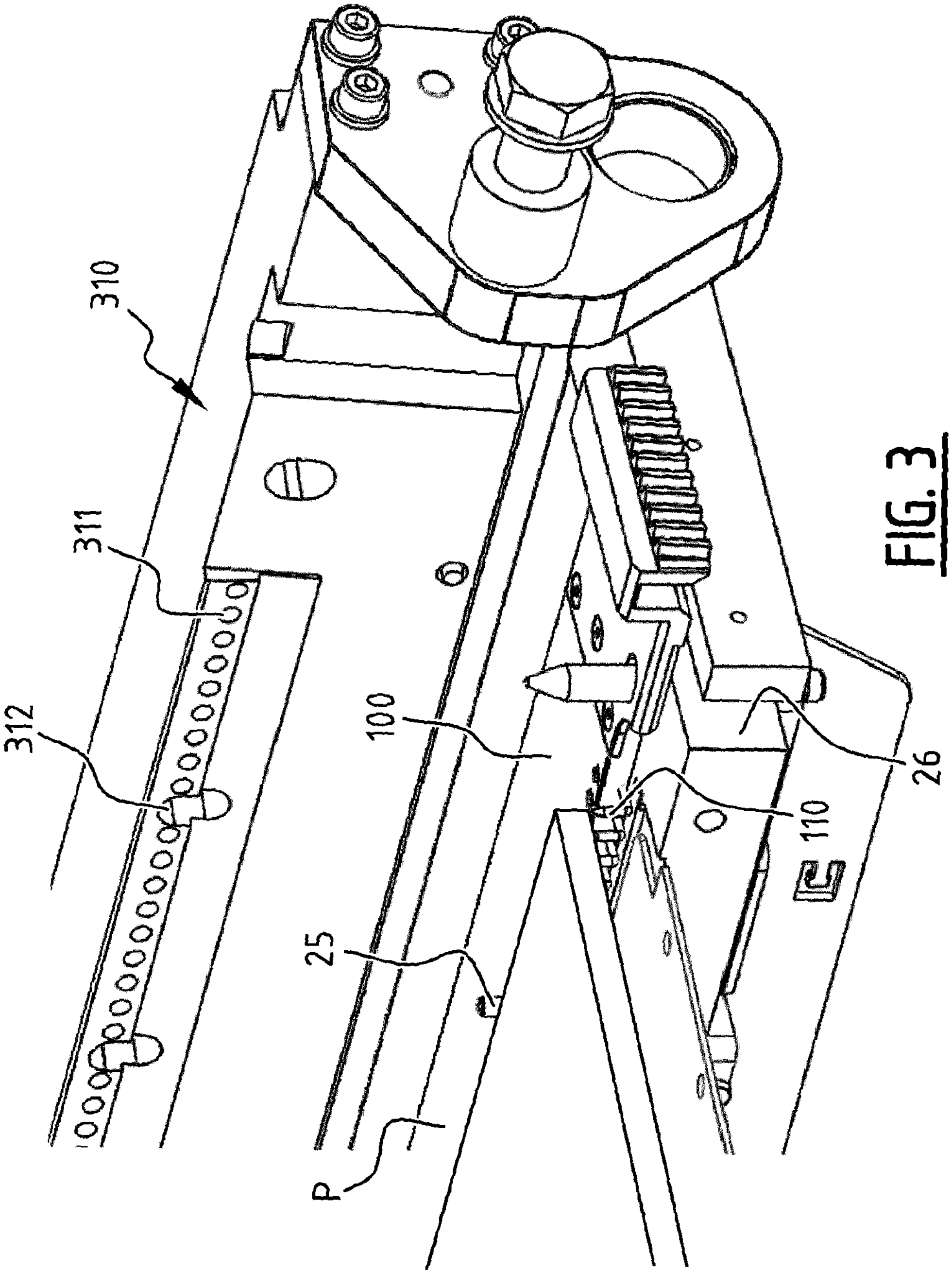
FIG. 3 is a detailed perspective view illustrating a relief plate precursor arranged against the abutment means of the punching station of FIG. 2.

The penetration elements 110 are arranged on a transport bar 100, and the punching station 300 is configured to receive the transport bar 100 in a position aligned with the abutment means 20, see FIGS. 2 and 2A. The hammer 310 is arranged movably, here pivotably around a horizontal transverse axis, such that it can be engaged against the edge portion E of the relief plate precursor in order to arrange the one or more penetration elements 110 in the edge portion E of the relief plate precursor P. The transport bar 100 is arranged such that the penetration elements 110 are positioned below the edge portion E, and the hammer 310 is arranged on the other side of the edge portion, so that it can push the edge portion E downward onto the penetration elements 110. The hammer 310 is provided with one or more holes 311 corresponding with the one or more penetration elements 110, and optionally with a plurality of holes 312 corresponding with the alignment pins 25. It is noted that in another embodiment it is also possible to move the alignment pins 25 downward before hammering, cf. FIG. 6C, in which case the holes 312 are not required.

Preferably, the first and the second location along the abutment means 20 correspond with a location of a left and right side of the middle of the edge portion of the relief plate precursor, respectively. In the illustrated example this is realised by having the abutment parts 20*a*, 20*b* on a left and right side of the middle, cf. FIG. 4A.

Figures 7, 7A:
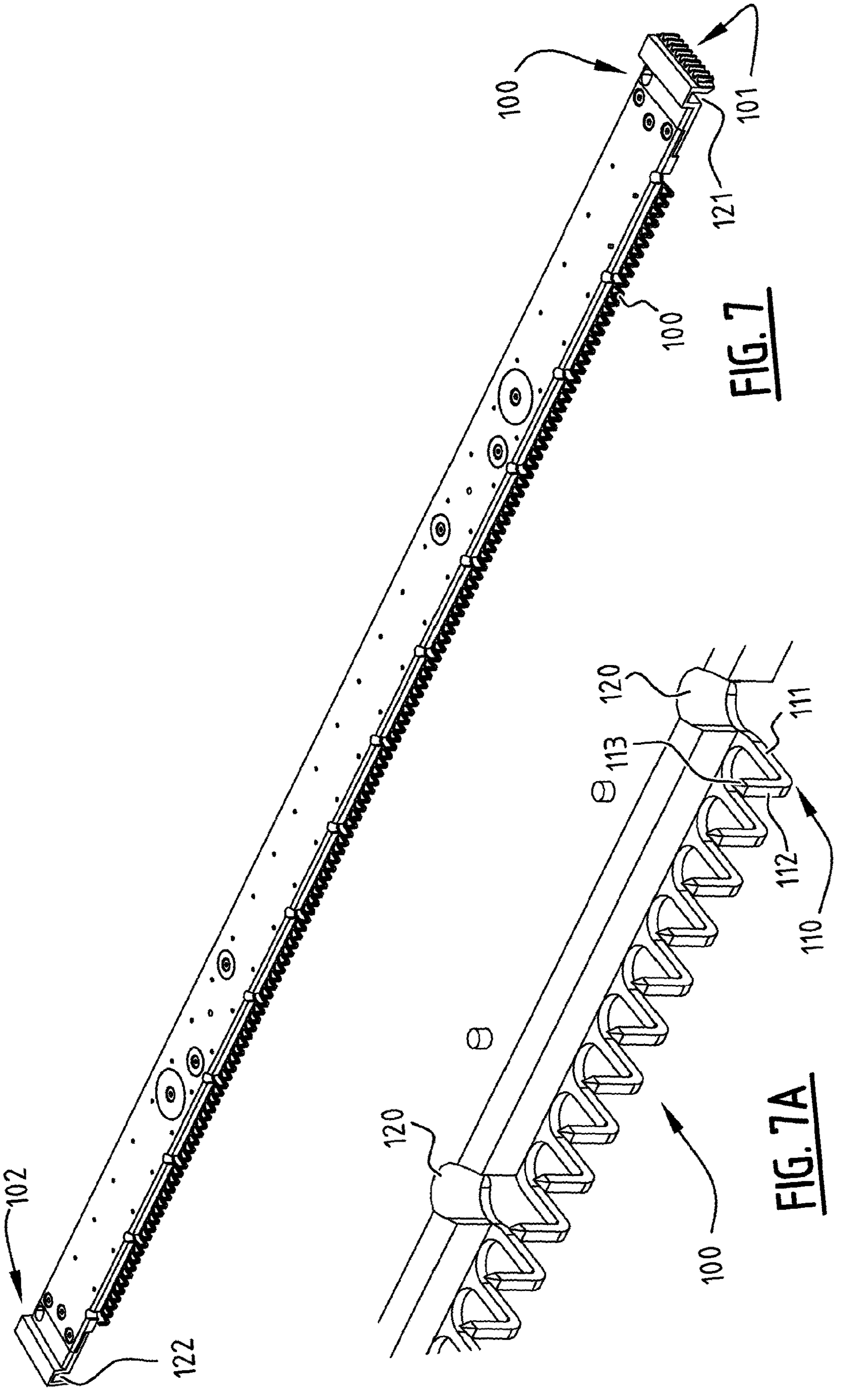
FIG. 7 is a schematic perspective view of an exemplary embodiment of a transport bar.
FIG. 7A is a detailed perspective view of a portion of the transport bar of FIG. 7.

FIGS. 7 and 7A illustrate a more detailed exemplary embodiment of a transport bar 100. As is best visible in FIG. 7A, the plurality of penetration elements 100 preferably have sharp tips 113, and the punching station 300 is preferably configured to cause a penetration of the plurality of penetration elements 110 at least partially into or through an unperforated edge portion E near the leading edge 3 of the relief plate precursor P.

The transport bar 100 is provided with a first coupling portion 121 and a second coupling portion 122 at the first end 101 and the second end 102. In this case the coupling portion 121 is configured with coupling means to be used in combination with a lead screw. FIG. 7A shows a close-up of the transport bar 100 with penetration elements 110. Each penetration element 110 has a connecting portion 111, a penetration portion 112 and a tip 113. It is worth noting that in this case the penetration portions 112 have a rectangular cross-section and an asymmetrical tip 113. Preferably, the penetration portion 112 has a maximum dimension, seen in a cross section perpendicular on the penetration direction, which is smaller than 5 mm, more preferably smaller than 3 mm. In other words, in the illustrated example of a rectangular cross section, the longest sides of the rectangle are preferably smaller than 5 mm, more preferably smaller than 3 mm. The transport bar 100 is equipped with channels 120 allowing pins to pass through the transport bar 100 from below the transport bar, see also FIGS. 6A and 6B discussed below.

It is noted that according to another exemplary embodiment, the apparatus 1000 of FIG. 1 may also be used with transport bars 100 which are provided with a plurality of penetration elements 110 which do not have a sharp tip. For example, the area near the leading edge 3 of the relief plate precursor P may be pre-perforated in a punching station 300 of FIG. 8 before bringing the relief plate precursor P to the station 300. The station 300 of FIG. 1 will then be a plate-coupling station and not a punching station, wherein the plurality of penetration elements 110 care then arranged through pre-perforated holes in the edge portion E near the leading edge 3.

Now a description of an exemplary embodiment of the punching station 300 and the steps taking place in the punching station 300 will be described with reference to FIGS. 6A-6E. FIGS. 6A and 6B illustrate a transport bar 100 in the coupling station 300. The punching station 300 comprises abutment means embodied with moveable pins 25 as in the embodiment of FIG. 2, configured for aligning a relief plate precursor P with respect to the transport bar 100. The movable pins 25 extend adjacent the transport bar 100. To that end, the transport bar 100 is provided with channels 120 allowing the pins 25 to pass through the transport bar 100 from below the transport bar 100 to a position in which they protrude through the transport bar 100, as is best visible in FIG. 6A. After having aligned the relief plate precursor P against the alignment pins 25, the alignment pins 25 are moved downward and a hammer tool 310 pushes the plurality of penetration elements 110 through the material of the relief plate precursor, see FIGS. 6C and 6D. In a preferred embodiment, the hammer tool 310 comprises a plurality of holes 311 configured for receiving the plurality of penetration elements 110. However, other hammer tools 310 are possible and the skilled person understands that it would also be possible to provide e.g. one elongated recess configured for receiving the plurality of penetration elements 110, instead of a series of holes 311.

It is noted that other transport bars and hammer tools exist in which the invention is applicable. For example FIGS. 5 and 6A, 6B of PCT application PCT/EP2019/060370 in the name of the applicant, which is included herein by reference, describe other possible transport bars.

It is noted that the shape of the penetration elements 110 may vary and the shape may be e.g. any one of the following: a tube, a blade, a needle, or a combinations thereof. Preferably, each penetration element 110 comprises a penetration portion 112 (see FIG. 7A) intended for extending substantially perpendicular through the relief plate precursor, wherein the penetration portion 112 has a length between 1 mm and 20 mm. In yet other embodiments, instead of providing the transport bar with a plurality of penetration elements, the transport bar could be provided with one or more elongated blade elements having a sharp edge.

As illustrated in FIG. 1, the apparatus 1000 preferably comprises a control unit 800 configured to control different components of the apparatus, such as the transport mechanisms 210, 220, 230, 250 such that when one transport bar 100 of the plurality of transport bars moves through the treatment compartment 400, another transport bar 100 moves back to the plate coupling station 300. More preferably, at least three transport bars move in the system. In FIG. 1, the apparatus 1000 is illustrated with four transport bars which are controlled such that there may be simultaneously one transport bar in the punching station 300, one transport bar in the treatment compartment 400, one transport bar in the plate decoupling station 500, and one transport bar being transported backward by the backward transport mechanism 230. Preferably, one of the at least two transport bars is being transported through the treatment zone whilst another one is being transported back to the coupling station. Further, the transport speed in the forward transport direction Tf may be different from the transport speed in the backward transport direction Tb, wherein preferably the transport speed in the backward transport direction Tb is faster than in the forward transport direction Tf. For example, the ratio of the transport speed in the backward transport direction divided by the speed in the forward transport direction may be in the range from 1 to 400, preferably 2 to 300. Typically, the forward and backward transport speed is in the range from 1 mm/sec to 1000 mm/sec.

Figure 8A:
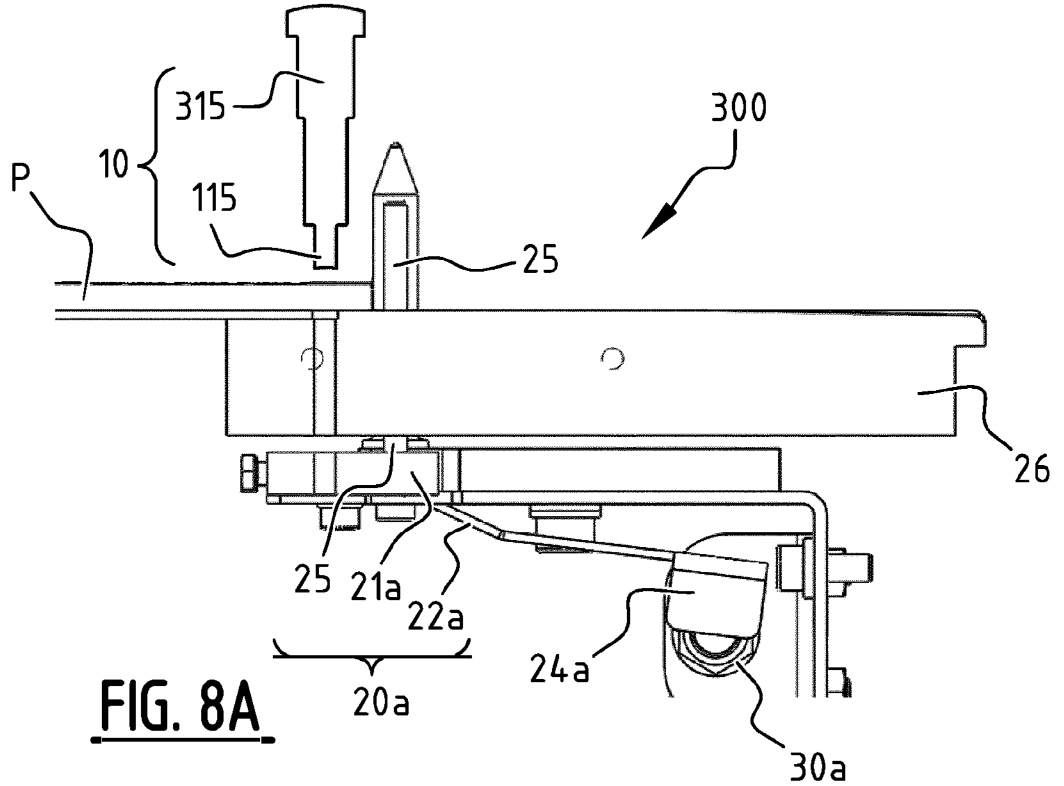
FIGS. 8A-8C are schematic cross-sections illustrating another embodiment of a punching station.
Figure 8B:
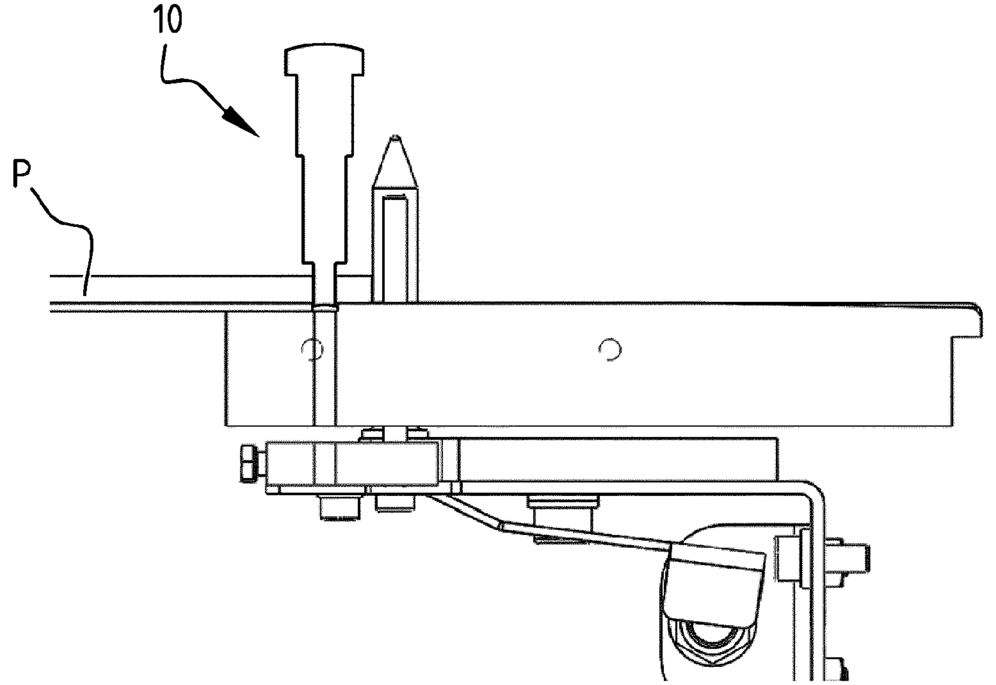
Figure 8C:
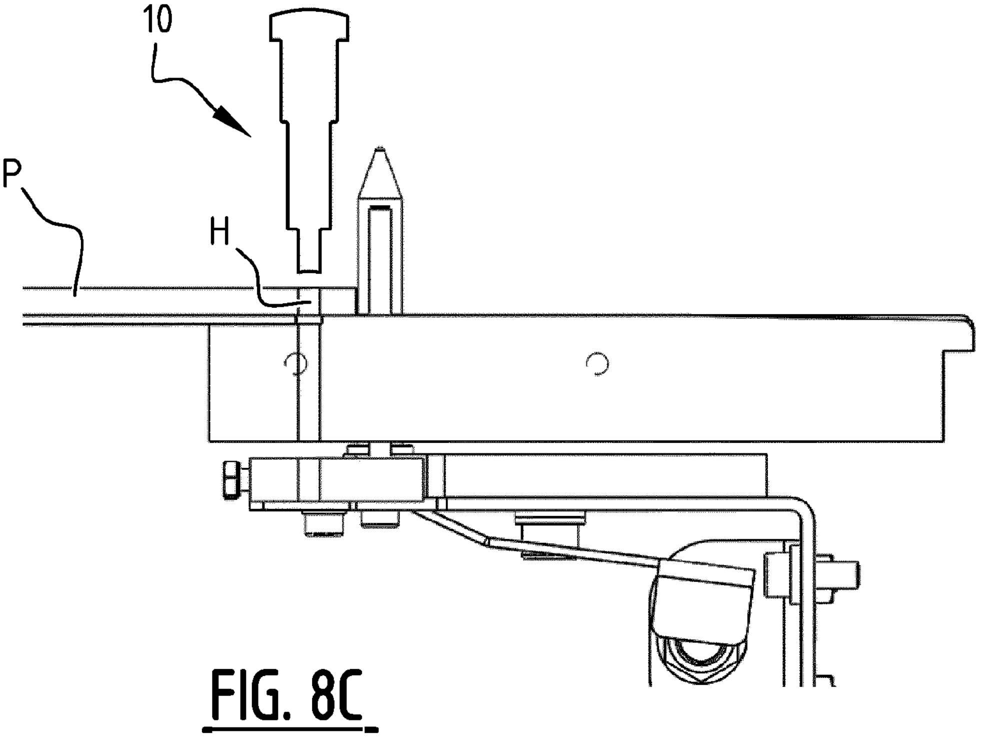

FIGS. 8A-8C illustrate schematically another embodiment of a punching station 300 for arranging one or more perforations in an edge portion E of a relief plate precursor P. The punching station 300 comprises a punching means 10 comprising one or more perforating elements 115. The punching means 10 is configured for arranging the one or more perforating elements 115 through the edge portion E of the relief plate precursor P in order to arrange one or more through-holes H in the relief plate precursor P. The punching station 300 comprises an abutment means 20*a* aligned with the punching means 10 and configured for forming an abutment for the edge of the relief plate precursor P. The abutment means 20*a* may be similar to the abutment means 20*a* described in connection with FIGS. 4A and 4B above, and a description thereof is omitted. The punching station 300 comprises a detection means 30*a* configured to detect at a location along the abutment means 20*a* whether the edge portion of the relief plate precursor is correctly positioned against the abutment means 20*a*, and a signalling means (not shown) configured to communicate a signal in function of the detection by the detection means 30*a*. The detection means 30*a* may be similar to the detection means 30*a* described in connection with FIGS. 4A and 4B above, and a description thereof is omitted. Further, as in the embodiment of FIGS. 4A and 4B, multiple abutment means 20*a*, 20*b* and detection means 30*a*, 30*b* may be provided. FIG. 8A shows the punching means 10 before perforating the edge portion E of the relief plate precursor P, FIG. 8B shows the punching means 10 during the perforating and FIG. 8C shows the punching means 10 after the perforating, illustrating that a through-hole H has been arranged in the edge portion E of the relief plate precursor P. Typically a row of through-holes will be arranged, e.g. at least ten through-holes. The relief plate precursor P with the perforated holes may be coupled to a transport bar in a plate coupling station, e.g. a coupling station which is part of an apparatus for treating a relief plate precursor P. This may be e.g. the apparatus of FIG. 1 where the punching station 300 is replaced with a plate coupling station and where the relief plate precursor is pre-perforated in a separate punching (perforating) station 300 as shown in FIGS. 8A-8C, before being introduced in the plate coupling station.

A relief plate precursor generally comprises a support layer made of a first material and an additional layer made of a second material which is different from said first material. The support layer may be a flexible metal, a natural or artificial polymer, paper or combinations thereof. Preferably the support layer is a flexible metal or polymer film or sheet. In case of a flexible metal, the support layer could comprise a thin film, a sieve like structure, a mesh like structure, a woven or non-woven structure or a combination thereof. Steel, copper, nickel or aluminium sheets are preferred and may be about 50 to 1000 μm thick. In case of a polymer film, the film is dimensionally stable but bendable and may be made for example from polyalkylenes, polyesters, polyethylene terephthalate, polybutylene terephthalate, polyamides and polycarbonates, polymers reinforced with woven, nonwoven or layered fibres (e.g. glass fibres, Carbon fibres, polymer fibres) or combinations thereof. Preferably polyethylene and polyester foils are used and their thickness may be in the range of about 100 to 300 μm, preferably in the range of 100 to 200 μm. A relief plate precursor may carry an additional layer. For example, the additional layer may be any one of the following: a direct engravable layer (e.g. by laser), a solvent or water developable layer, a thermally developable layer, a photosensitive layer, a combination of a photosensitive layer and a mask layer. Optionally there may be provided one or more further additional layers on top of additional layer. Such one or more further additional layers may comprise a cover layer at the top of all other layers which is removed before the imageable layer is imaged. The one or more additional layers may comprise a relief layer, and an anti-halation layer between the support layer and the relief layer or at a side of the support layer which is opposite of the relief layer. The one or more additional layers may comprise a relief layer, an imageable layer, and one or more barrier layers between the relief layer and the imageable layer which prevent diffusion of oxygen. Between the different layers described above one or more adhesion layers may be located which ensure proper adhesion of the different layers.

Whilst the principles of the invention have been set out above in connection with specific embodiments, it is to be understood that this description is merely made by way of example and not as a limitation of the scope of protection which is determined by the appended claims.

The invention claimed is:

1. A punching station for arranging one or more penetration elements in an edge portion of a relief plate precursor, said punching station comprising:

a transport bar with one or more penetration elements;

a punching means configured for arranging the one or more penetration elements in an edge portion of the relief plate precursor, so as to couple the edge portion of the relief plate precursor to the transport bar;

abutment parts aligned with the punching means and configured for forming an abutment for the edge of the relief plate precursor, wherein the abutment parts comprise at least a first abutment part and a second abutment part, each of which is movably arranged, such that when the edge portion is correctly positioned at a first location the first abutment part is in a first position and when the edge portion is not correctly positioned at said first location the first abutment part is in a second position, and such that when the edge portion is correctly positioned at a second location the second abutment part is in a first position and when the edge portion is not correctly positioned at said second location the second abutment part is in a second position;

a detection means configured to detect at said first location and at said second location whether the edge portion of the relief plate precursor is correctly positioned against said first abutment part and against said second abutment part;

a signalling means configured to communicate a signal to the punching means in function of the detection by the detection means.

2. The punching station according to claim 1, further comprising a signalling interface or an operator interface, wherein the signalling means is configured to communicate the signal to the signalling interface and/or operator interface, and/or wherein the signalling or operator interface is configured to generate an output based on said signal which can be sensed by an operator.

3. The punching station according to claim 1, wherein the first abutment part and the second abutment part are pivotable from the first position to the second position and vice versa.

4. The punching station according to claim 1, wherein the detection means comprises a first and a second detector configured to detect a position of the first and the second abutment part, respectively.

5. The punching station according to claim 1, wherein the detection means comprises any one of the following: an optical detection means, a proximity detection means, a pressure detection means, an electrical detection means, a magnetic detection means, a mechanical detection means, a ferrous/non-ferrous metal detection means, or a combination thereof.

6. The punching station according to claim 1, wherein the abutment parts comprises a plurality of alignment pins arranged in a row such that they can extend along the edge portion of the relief plate precursor.

7. The punching station according to claim 1, wherein the punching means comprises a hammer configured to arrange the one or more penetration elements in an edge portion of the relief plate precursor.

8. The punching station according to claim 7, wherein the hammer is arranged movably such that it can be engaged against the edge portion of the relief precursor in order to arrange the one or more penetration elements in an edge portion of the relief plate precursor.

9. The punching station according to claims 7, wherein the transport bar is arranged to be positioned with the one or more penetration elements on one side of the edge portion and the hammer is arranged to engage the other side of the edge portion, wherein the hammer is provided with one or more holes corresponding with the one or more penetration elements.

10. The punching station according to claim 7, wherein the abutment parts are arranged in a movable manner, such that they can be moved away, and in particular lowered, when the hammer is activated.

11. The punching station according to claim 1, wherein the first and the second location along the abutment parts correspond with a location of a left and right side of the middle of the edge portion of the relief plate precursor, respectively.

12. An apparatus for treating a relief plate precursor comprising:

a transport system with at least one transport bar;

a punching station configured for coupling an edge of a relief plate precursor to a transport bar of said at least one transport bar; said punching station comprising:

a punching means comprising one or more penetration elements, said punching means being configured for arranging the one or more penetration elements in an edge portion of the relief plate precursor, so as to couple the edge portion of the relief plate precursor to said transport bar;

abutment parts aligned with the punching means and configured for forming an abutment for the edge of the relief plate precursor, wherein the abutment parts comprise at least a first abutment part and a second abutment part, each of which is movably arranged, such that when the edge portion is correctly positioned at a first location the first abutment part is in a first position and when the edge portion is not correctly positioned at said first location the first abutment part is in a second position, and such that when the edge portion is correctly positioned at a second location the second abutment part is in a first position and when the edge portion is not correctly positioned at said second location the second abutment part is in a second position;

a detection means configured to detect at said first location and said second location whether the edge portion of the relief plate precursor is correctly positioned against said first abutment part and against said second abutment part;

a signalling means configured to communicate a signal to the punching means in function of the detection by the detection means;

a hammer configured to arrange the one or more penetration elements in an edge portion of the relief plate precursor;

a treatment compartment configured for treating the relief plate precursor.

13. The apparatus according to claim 12, wherein the transport system is configured for transporting the relief plate precursor such that a leading edge of the relief plate precursor touches the abutment parts, and such that the signalling means triggers the punching means.

14. The apparatus according to claim 12, further comprising a decoupling station configured to decouple the relief plate precursor from the transport bar, wherein the transport system is configured to move the transport bar from an outlet side of the treatment compartment through a discharge zone to the decoupling station such that the relief plate precursor can be discharged in the discharge zone after being decoupled from the transport bar and/or a removal means configured to remove a treated relief plate precursor after being decoupled from the transport bar in the decoupling station.

15. The apparatus according to claim 12, wherein the transport system comprises a forward transport mechanism configured to transport the transport bar with the coupled relief plate precursor at least from an inlet side to an outlet side of the treatment compartment, and from the outlet side to the decoupling station, wherein preferably the transport system further comprises a bar coupling means configured to couple the transport bar with coupled relief plate precursor to the forward transport mechanism; wherein preferably the transport system comprises a backward transport mechanism configured to transport the transport bar from the decoupling station back to the coupling station.

16. The apparatus according to claim 12, wherein the at least one transport bar comprises at least two transport bars, said apparatus comprising a control unit configured to control the transport system, such that the at least two transport bars move simultaneously through the apparatus, wherein optionally the signalling means may be part of the control unit.

17. A punching method for arranging one or more penetration elements of a transport bar in an edge portion of a relief plate precursor, said punching method being performed in a punching station, and comprising the steps of:

bringing a relief plate precursor with a leading edge against at least a first abutment part and a second abutment part, each of which is movably arranged, such that when the edge portion is correctly positioned at a first location the first abutment part is in a first position and when the edge portion is not correctly positioned at said first location the first abutment part is in a second position, and such that when the edge portion is correctly positioned at a second location the second abutment part is in a first position and when the edge portion is not correctly positioned at said second location the second abutment part is in a second position;

detecting at said first location and said second location whether the edge portion of the relief plate precursor is correctly positioned against said first abutment part and said second abutment part;

communicating a signal in function of said detecting;

arranging the one or more penetration elements in an edge portion of the relief plate precursor when a signal indicating a correct positioning at the first and the second location has been communicated, so as to couple the edge portion of the relief plate precursor to the transport bar.

18. A method for treating a relief plate precursor comprising the steps of claim 17, wherein the method further comprises the steps of transporting the transport bar with the attached relief plate precursor through a treatment zone whilst removing soluble or liquefiable material and establishing a relief in the relief plate precursor, detaching the relief plate precursor from the transport bar in a decoupling station.

19. A punching station for arranging one or more penetration elements in or through an edge portion of a relief plate precursor or for arranging one or more perforations in an edge portion of a relief plate precursor, said punching station comprising:

one or more penetration elements or perforating elements arranged next to each other, a hammer configured for arranging the one or more penetration elements or perforating elements through or in an edge portion of the relief plate precursor;

a first alignment pin and a second alignment pin aligned with said one or more penetration elements or perforating elements and arranged such that they extend along the edge portion of the relief plate precursor, wherein the first and the second alignment pins are pivotable around a horizontal axis from a first position to a second position and vice versa, such that when the edge portion contacts said first and second alignment pins, said first and second alignment pins pivot from the second position into the first position;

a first detector and a second detector configured to detect whether said first alignment pin and said second alignment pin have pivoted, respectively;

a signalling means configured to trigger the hammer when a pivoting movement of the first and second alignment pins has been detected by the first and second detector.

20. The punching station according to claim 19, wherein the penetration elements are arranged on a transport bar, and wherein each of said first and second alignment pins extends through a recess or hole or channel in the transport bar.

* * * * *